(12) United States Patent
Gaucher et al.

(10) Patent No.: US 11,858,476 B2
(45) Date of Patent: Jan. 2, 2024

(54) DEVICE FOR CONNECTING A WIPER BLADE TO A DRIVING ARM

(71) Applicant: Valeo Systemes d'Essuyage, Le Mesnil Saint Denis (FR)

(72) Inventors: Vincent Gaucher, Le Mesnil Saint Denis (FR); Eric Poton, Le Mesnil Saint Denis (FR); Stéphane Houssat, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/874,662

(22) Filed: Jul. 27, 2022

(65) Prior Publication Data

US 2023/0030984 A1 Feb. 2, 2023

(30) Foreign Application Priority Data

Jul. 30, 2021 (FR) ...................................... 2108305

(51) Int. Cl.
*B60S 1/40* (2006.01)

(52) U.S. Cl.
CPC .............. *B60S 1/4003* (2013.01); *B60S 1/40* (2013.01); *B60S 1/4038* (2013.01);
(Continued)

(58) Field of Classification Search
CPC .... B60S 1/4003; B60S 1/4038; B60S 1/4045; B60S 1/4048; B60S 1/4067; B60S 2001/4051; B60S 2001/4054; B60S 1/40
(Continued)

(56) References Cited

U.S. PATENT DOCUMENTS 8,707,506 B1 4/2014 Wu
2011/0247166 A1* 10/2011 Depondt ................. B60S 1/387
15/250.32

(Continued)

FOREIGN PATENT DOCUMENTS

CN 103303261 B 1/2016
CN 105984435 B 3/2018
(Continued)

OTHER PUBLICATIONS

Machine translation of description portion of German publication 202014102928, published Aug. 2014. (Year: 2014).*

(Continued)

*Primary Examiner* — Gary K. Graham
(74) *Attorney, Agent, or Firm* — Osha Bergman Watanabe & Burton LLP

(57) ABSTRACT

A connection device (1) for connecting a wiper blade to a driving arm for a vehicle is disclosed. At least one connector is configured to be secured to the wiper blade. The connection device (1) comprises a base adapter (25) and at least one complementing adapter (26, 27), this base adapter (25) being equipped with at least one pivot member (50) connecting it to the connector (24), the base adapter (25) being configured to connect this connector (24) to a first type of driving arm, the base adapter (25) bearing at least one reference, the complementing adapter (26, 27) bearing at least one marking, a combination of the base adapter (25) and the complementing adapter (26, 27) generating a code visually associated with another type of driving arm, different from the first type of driving arm, from a combination of the reference and the marking.

9 Claims, 5 Drawing Sheets

(52) U.S. Cl.
CPC ........... *B60S 1/4067* (2013.01); *B60S 1/4045* (2013.01); *B60S 1/4048* (2013.01); *B60S 2001/4051* (2013.01); *B60S 2001/4054* (2013.01)

(58) Field of Classification Search
USPC ...................................................... 15/250.32
See application file for complete search history.

(56) References Cited

U.S. PATENT DOCUMENTS

| | | |
|---|---|---|
| 2012/0060316 A1 | 3/2012 | Avasiloaie et al. |
| 2015/0089764 A1* | 4/2015 | Wu .................. B60S 1/4003 15/250.32 |

FOREIGN PATENT DOCUMENTS

| | | |
|---|---|---|
| DE | 102010003269 A1 | 9/2011 |
| DE | 202014102928 U1 | 7/2014 |
| WO | 2012/152545 | * 11/2012 |

OTHER PUBLICATIONS

Preliminary Search Report and Written Opinion issued in corresponding French Application No. 2108305, dated Apr. 15, 2022 (9 pages).

* cited by examiner

[Fig. 1]
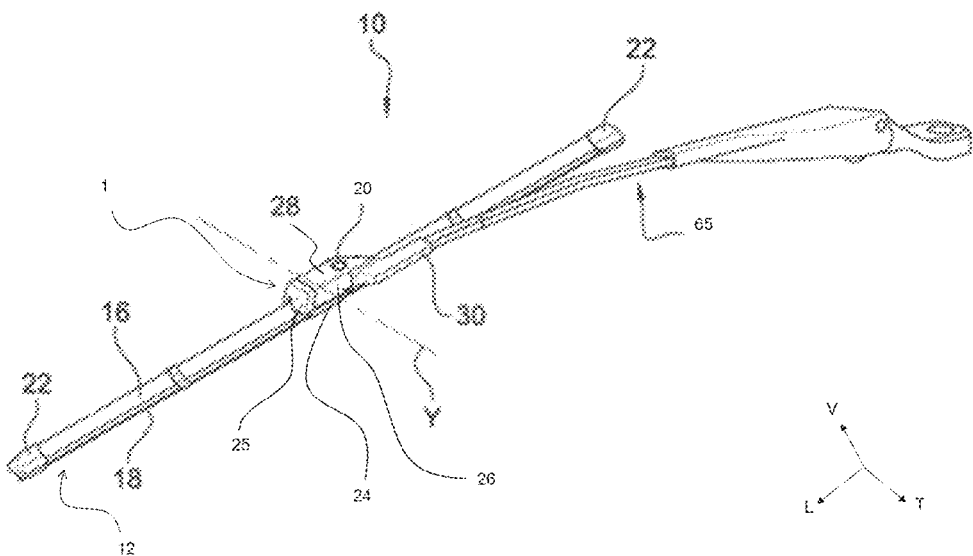
[Fig. 2]
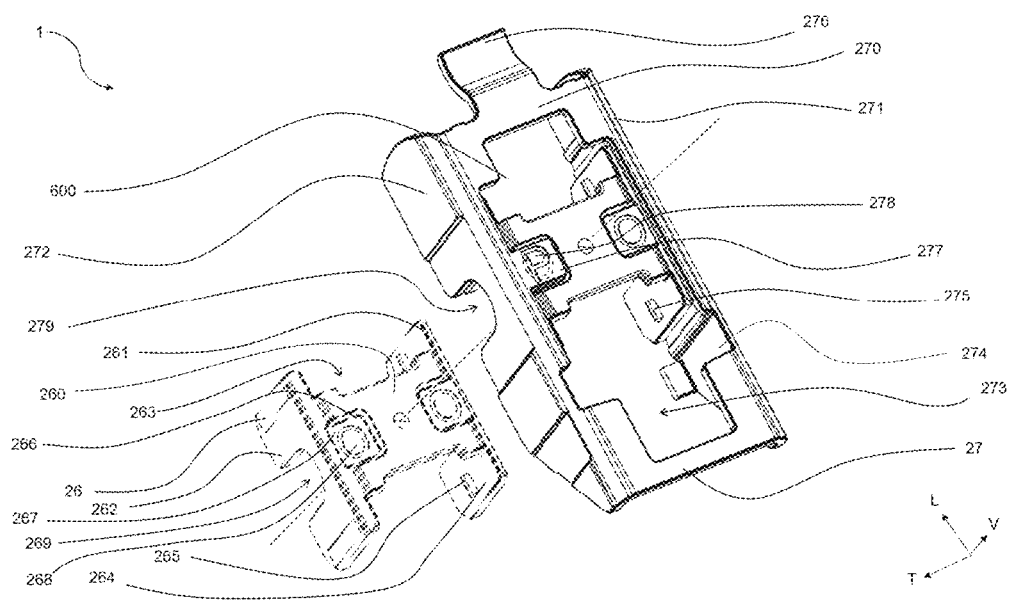

[Fig. 3]
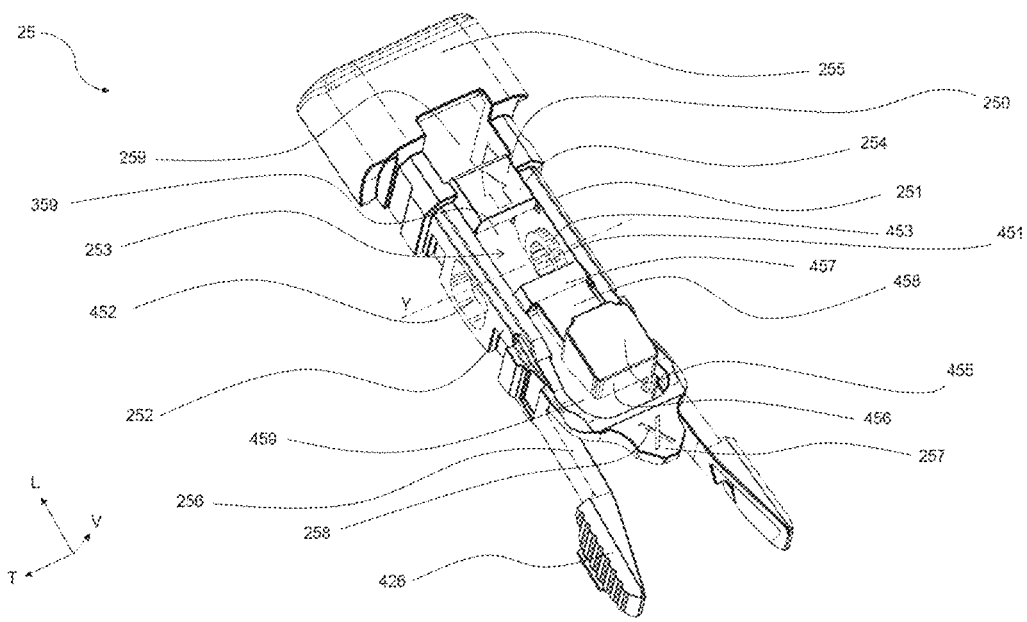
[Fig. 4]
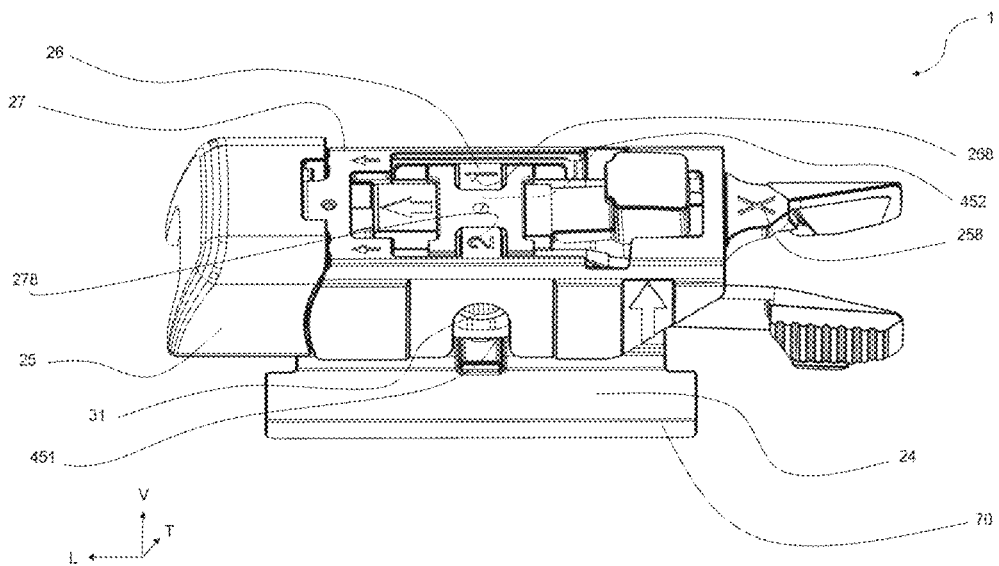

[Fig. 5]
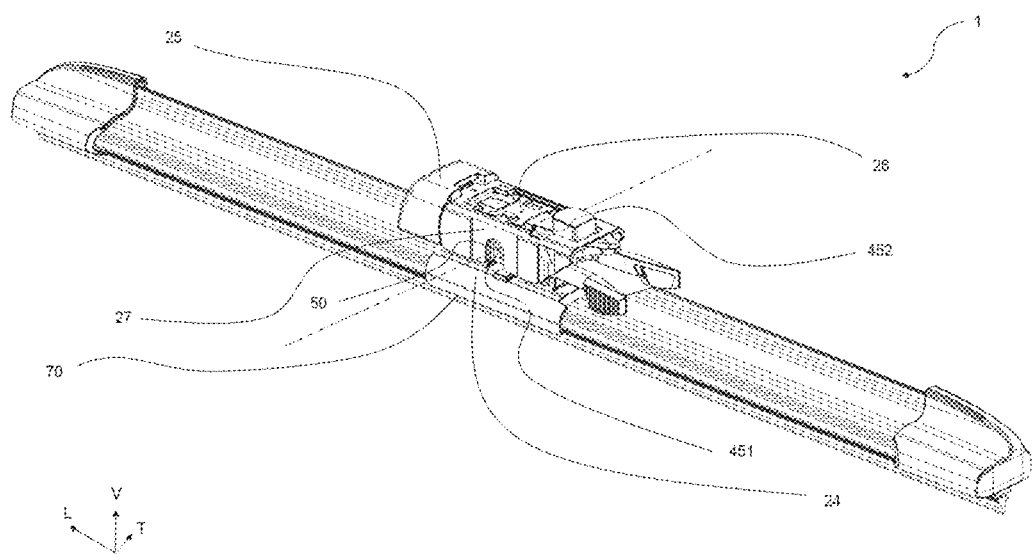
[Fig. 6]
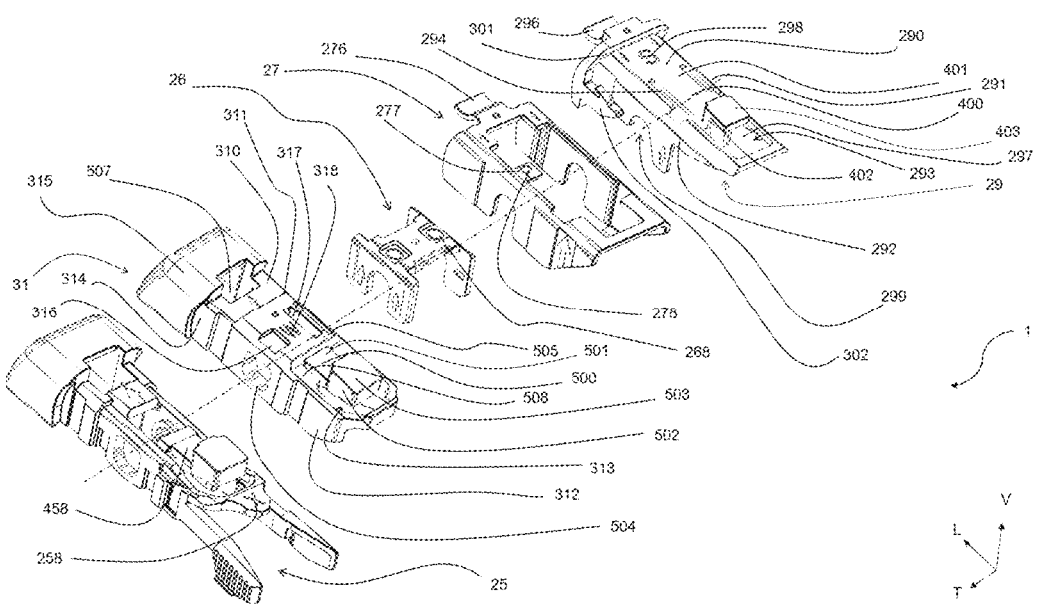

[Fig. 7]
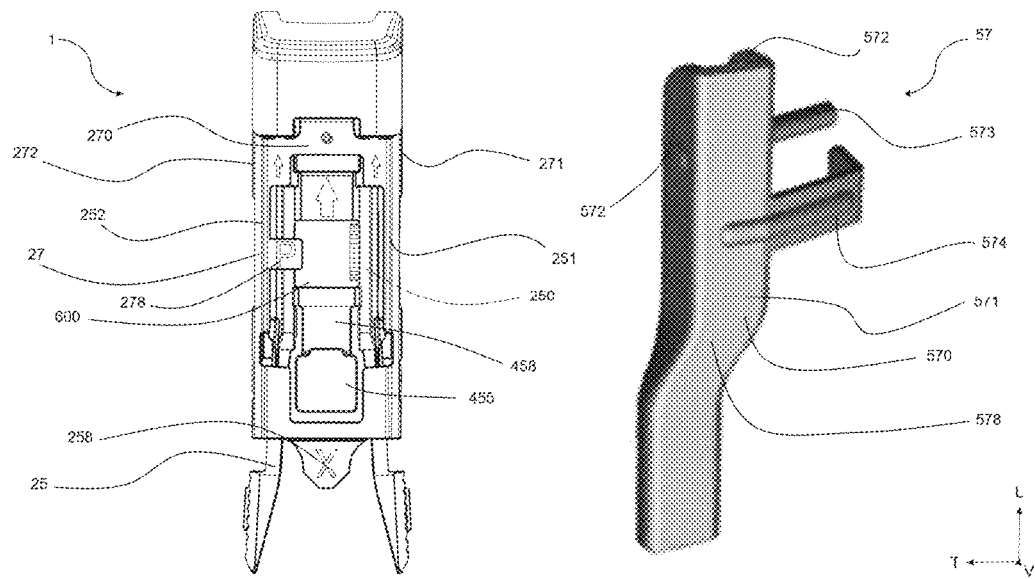
[Fig. 8]
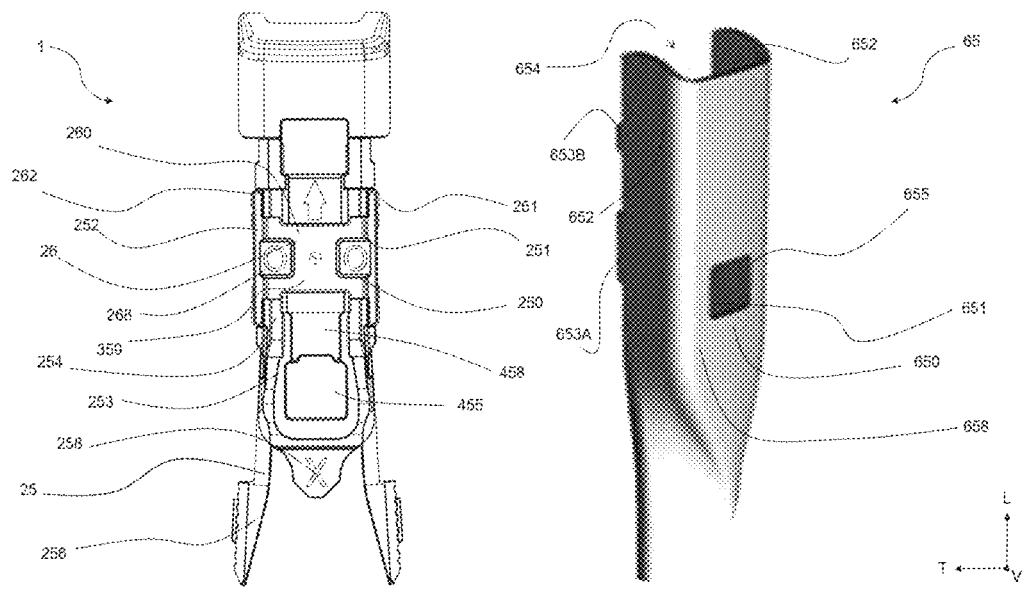

[Fig. 9]
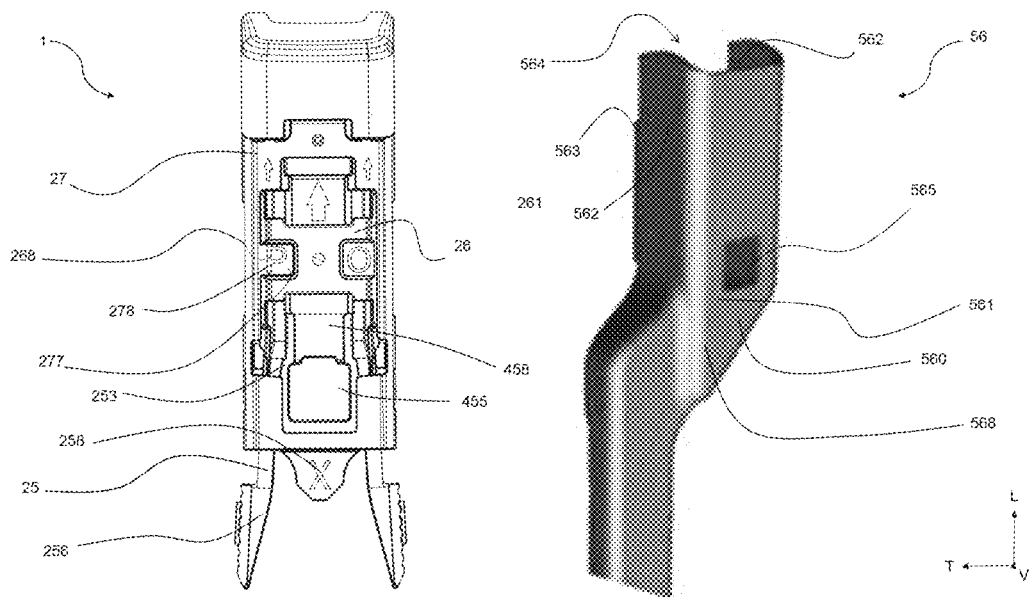
[Fig. 10]
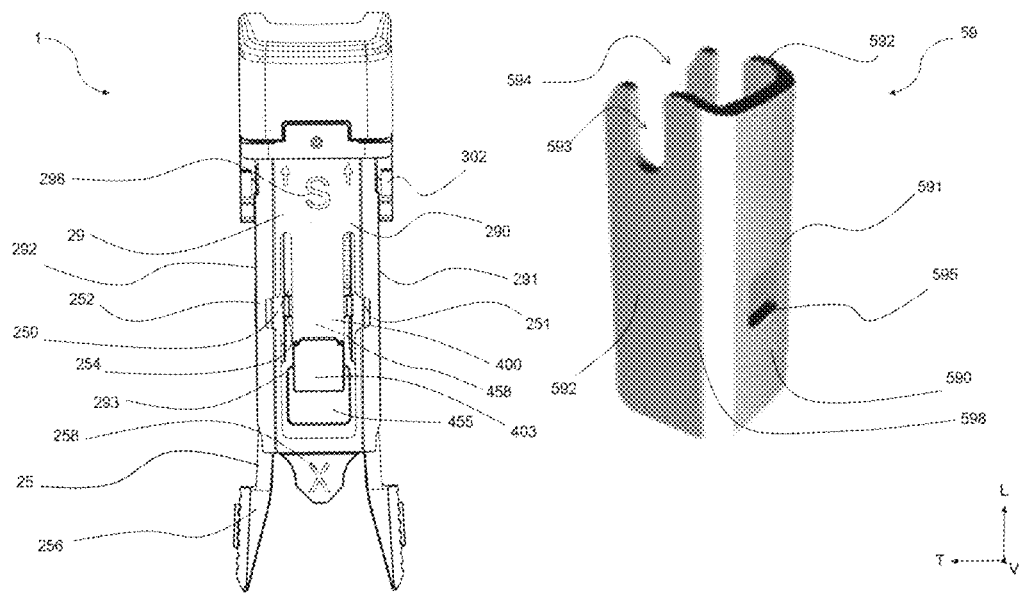

DEVICE FOR CONNECTING A WIPER BLADE TO A DRIVING ARM

The present invention relates to the field of vehicle wipers and more particularly connection devices allowing a wiper blade to be connected to a driving arm.

Wiper systems for vehicles are designed to remove liquids and dirt, which can disrupt the driver's view of his surroundings, by wiping. These wiper systems generally comprise a driving arm that carries out an angular back-and-forth movement, and elongate wiper blades equipped with blade rubbers made of a resilient material. The blade rubber rubs against the windscreen and removes this liquid and dirt by sweeping it out of the driver's field of view.

The wiper blade is attached to the driving arm by a connection device which comprises a connector and an adapter. The connector is a component that is secured to the wiper blade, and which is generally secured to the blade rubber. The adapter is a component that is interposed between the driving arm and the connector, being shaped to fit into an endpiece belonging to the driving arm. The connector and adapter then collaborate to provide the articulated connection and to fix the wiper blade to the driving arm, thus forming the device for connecting the wiper blade to the driving arm.

The articulated connection between the connector and the adapter comprises at least one transverse axis of pivoting of the connector with respect to the adapter, which is also an axis of pivoting of the wiper blade with respect to the driving arm. One of the members, for example the connector, generally comprises a substantially cylindrical shape which forms a pivot and which is received in a housing of complementary shape in the other member, in this instance the adapter.

An adapter allows a wiper blade to be combined with a particular type of endpiece or driving arm, and there are numerous varieties of endpiece. These varieties are similar in appearance but differ from one another in terms of their dimensions, particularly their widths or lateral dimensions. They also vary in terms of the positions of the orifices designed to interact with a push-button for locking of the adapter.

Thus there are different adapters, so as to be able to combine a given wiper blade with a number of endpieces and, by extension, a number of driving arms.

It is then necessary for the user, who has cause to replace their wiper blade, to ensure that the mounting of the connection device, with these different adapters, corresponds well to the driving arm of the vehicle on which it is designed to be mounted.

However, it can be complicated for a user to understand how these adapters are mounted for a given type of driving arm. This problem is all the more pertinent when the user in question is uninitiated, that is to say an individual without the necessary skills to perform the assembly required.

Moreover, the different adapters proposed in the packaging of wiper blades for accommodating various existing types of driving arm are bulky and also excessively heavy.

The present invention resolves these technical problems by proposing a connection device allowing the user to easily check that the adapter mounted on the wiper blade corresponds correctly to the driving arm of the vehicle designed to receive this wiper blade. Such a connection device has adapters with visual markings or references which, when combined, form a code, the user reading this code then being able to combine it with a given driving arm. The invention allows easier reading by combining individual markings or references, rather than a code for each adapter.

Furthermore, the present invention offers advantages associated with the packaging of the adapters. Because the embodiments of these adapters result in a reduction in the plastics material required for manufacturing them, the bulk and so also the weight of these adapters are therefore reduced.

A subject of the present invention thus relates to a connection device for connecting a wiper blade to a driving arm for a vehicle, comprising at least one connector configured to be secured to the wiper blade. According to the invention, this device comprises a base adapter and at least one complementing adapter, this base adapter being equipped with at least one pivot member connecting it to the connector, the base adapter being configured to connect this connector to a first type of driving arm, the base adapter bearing at least one reference designed to associate the base adapter with this first type of driving arm, the complementing adapter bearing at least one marking, a combination of the base adapter and the complementing adapter generating a code visually associated with another type of driving arm, different from the first type of driving arm, from a combination of the reference and the marking.

The connection device therefore comprises at least one connector and at least two adapters. This connector provides the connection between the connection device and the wiper blade, while the adapters contribute to connecting this connector to a particular type of driving arm. The adapters may connect the connector to the particular type of driving arm directly or else may involve other components, for example one or more complementing adapters, in making this connection.

The base adapter comprises a pivot member connecting it to the connector. This pivot member constitutes an articulation that allows the connector to rotate with respect to this adapter. When the connector is secured to a wiper blade, this wiper blade can thus pivot with respect to the adapter and to the driving arm to which this adapter is connected. As a result, the wiper blade can closely follow the surface of the windscreen of the vehicle to which it is fitted, in order to sweep it satisfactorily.

Each adapter bears a reference or marking that makes it possible for the user to visually associate an adapter with a particular type of driving arm. It will be appreciated that reading the references and markings allows the user to identify each of the adapters, but also to combine these adapters. The combination of the references and markings gives a code which makes it possible to identify a particular type of driving arm.

Advantageously, the references and markings are positioned on a face of the adapters that is visible to the user when they make use of the connection device. These references or markings may notably be letters or numbers.

According to one feature of the invention, the connection device, notably the one and/or the other of the adapters, comprises at least one stop and one locking member which are intended to secure the adapter relative to the driving arm with which it is intended to be associated. The adapter and the driving arm are thus secured to one another, the stop and the locking member preventing the translational movement of the driving arm relative to the adapter. The locking member may for example be a push-button, a tongue or else legs of the adapter.

According to one feature of the invention, the locking member is positioned on an upper wall of the adapter. The locking member may thus be positioned on the upper wall of the base adapter or on the upper wall of the complementing adapter. The locking member is positioned on the upper wall, notably projecting therefrom.

According to another feature of the invention, the at least one complementing adapter comprises a first adapter which has at least one cavity, this cavity comprising an end wall, the marking of the first adapter being positioned on this end wall, the combination of the marking of the first adapter with the reference of the base adapter forming a code visually associated with a second type of driving arm. This cavity corresponds to a depression in a portion of the first adapter, notably a depression made in an upper wall of the adapter, the latter having a U-shaped cross section with the upper wall interposed between two lateral walls. In this instance, the second type of driving arm is another type of driving arm that is different from the first type of driving arm with which the base adapter is associated.

According to one feature, the at least one complementing adapter comprises a second adapter which has at least one protrusion, the marking of the second adapter being positioned on this protrusion, the combination of the marking of the second adapter with the reference of the base adapter forming a code visually associated with a third type of driving arm. This protrusion corresponds to a portion of the second adapter which protrudes from a body of this adapter, this protrusion extending for example from one of the lateral walls of the second adapter. It will be appreciated that the third type of driving arm is another type of driving arm that is different from both the first type of driving arm and the second type of driving arm.

The second adapter differs from the first adapter at least in that it comprises a curved tab that comes housed inside a head of the base adapter.

According to another feature, the protrusion of the second adapter comes housed in the cavity in the first adapter, the marking of the second adapter being at least partially superposed on the marking of the first adapter, the combination of the marking of the first adapter, the marking of the second adapter and the reference of the base adapter forming a code visually associated with a fourth type of driving arm. The first adapter comes housed in the second adapter, which is therefore superposed thereon. The protrusion bears the marking of the second adapter. By coming housed in the cavity in the first adapter, which for its part bears the marking of this first adapter, it comes superposed at least partially on the latter. It thus covers it such that the marking of the first adapter is no longer readable. Such a superposition makes it possible to create a new combination of markings with the reference of the base adapter, which forms a code visually associated with a fourth type of driving arm. This fourth type of driving arm is structurally different from the first, second and third types of driving arm.

According to another feature of the invention, the at least one complementing adapter comprises a third adapter, this third adapter having at least one marking, the combination of the marking of the third adapter with the reference of the base adapter forming a code being designed to visually associate this third adapter with a fifth type of driving arm. It will be appreciated that this fifth type of driving arm is another type of driving arm that is structurally different from the first, second, third and fourth types of driving arm.

According to one aspect of the invention, at least two adapters fit one inside the other. Such interfitting is manifested in the fact that the adapters, which are substantially U-shaped components, can be nested one inside the other. One U-shaped adapter can thus cover another U-shaped adapter, which may itself cover yet another U-shaped adapter, notably the base adapter. In one embodiment, the base adapter is covered by at least one complementing adapter, notably by the first adapter, which may itself be covered by the second adapter.

The invention also relates to a wiper blade comprising a connection device as described in the present document.

The invention lastly relates to a wiper system comprising a driving arm bearing a wiper blade comprising a connection device, the wiper blade being connected to the driving arm by means of the connection device described hereinabove.

Further features, details and advantages of the invention will emerge more clearly on reading, on the one hand, the following description, and, on the other hand, an exemplary embodiment provided by way of non-limiting example with reference to the appended drawings, in which:

FIG. 1 is a schematic perspective view of a wiper system in which a connection device according to the invention connects a wiper blade to a driving arm;

FIG. 2 illustrates a top view, in perspective, of part of the connection device from FIG. 1, with a first adapter and a second adapter;

FIG. 3 is a perspective view of a base adapter of the connection device from FIG. 1;

FIG. 4 is a perspective view of the connection device from FIG. 1, detached from the wiper blade;

FIG. 5 is another perspective view of the connection device from FIG. 1, secured to a wiper blade;

FIG. 6 shows various adapters that can be combined with a connector to form a connection device according to the invention;

FIG. 7 is a top view of the connection device comprising a second adapter and a base adapter, and also a particular type of driving arm;

FIG. 8 is a top view of the connection device comprising a first adapter and the base adapter, and also a particular type of driving arm;

FIG. 9 illustrates a top view of the connection device comprising the first adapter, the second adapter and the base adapter, and also a particular type of driving arm;

FIG. 10 illustrates a top view of the connection device, this connection device comprising the first adapter, the base adapter and a third adapter, and also a particular type of driving arm.

In the figures, elements that are common to several figures retain the same references.

In the following detailed description, the terms "longitudinal", "transverse" and "vertical" refer to the orientation of the connection device according to the invention. A longitudinal direction corresponds to a main direction of elongation of the wiper blade to which the connection device is secured, this longitudinal direction being parallel to a longitudinal axis L of a coordinate system L, V, T illustrated in the figures. A transverse direction corresponds to a direction containing the axis of rotation of the pivot member allowing pivoting between the base adapter and the connector of the connection device, this transverse direction being parallel to a transverse axis T of the coordinate system L, V, T and this transverse axis T being perpendicular to the longitudinal axis L. Lastly, a vertical direction corresponds to a direction parallel to a vertical axis V of the coordinate system L, V, T, this vertical axis V being perpendicular to the longitudinal axis L and to the transverse axis T.

Furthermore, references to "lower" and "upper" with regard to the elements of the connection device mean relative to the remoteness of these elements from the wiper blade, a lower end of such elements corresponding to the end positioned in the vicinity of this wiper blade, while an upper end corresponds to the end positioned distant from the wiper blade.

FIG. 1 schematically illustrates a wiper system 10 according to the invention, having a wiper blade 12 and a driving arm 65 for driving the wiper blade 12. The wiper blade 12 comprises a longitudinal body 16, a blade rubber 18, generally made of rubber, and at least one vertebra (not visible) which stiffens the blade rubber 18 and encourages it to press against a vehicle windscreen.

The schematically depicted wiper blade 12 further comprises end fittings or clips 22 for attaching the blade rubber 18 and the vertebra to the longitudinal body 16, these end fittings 22 being situated at each of the longitudinal ends of the longitudinal body 16.

The wiper blade 12 bears, substantially at its middle, a connection device 1 according to the invention. This connection device 1 notably comprises a connector 24 and at least two adapters. These adapters in this instance are a base adapter 25 and a complementing adapter, in this instance a first adapter 26.

The base adapter 25 and the first adapter 26 contribute to connecting the connector 24 to one particular type of driving arm, in this instance a second type of driving arm 65. The base adapter 25 and the first adapter 26 are mounted on the connector 24 in such a way as to maintain a degree of freedom to pivot about an axis of articulation Y which is a transverse axis substantially perpendicular to the longitudinal axis of the wiper blade 12. This degree of freedom allows the wiper blade 12 to pivot with respect to the driving arm 65 and thus allows the wiper blade 12 to follow the curvature of the windscreen as it moves. The base adapter 25 and the first adapter 26 may be detached from the driving arm 65, for example by pressing on an actuating button, in this instance a push-button 20, borne by the base adapter 25.

The driving arm 65 is driven by a motor, not depicted, to follow an angular back-and-forth movement that makes it possible to remove water and possibly other undesirable elements with which the windscreen is covered. The base adapter 25 and the first adapter 26 provide the connection between the wiper blade 12 and the driving arm 65. More specifically, they contribute to connecting a head or endpiece 28 belonging to the driving arm 65, and which may be formed as one piece with the driving arm 65 or else may be attached and fixed to a rod thereof.

The endpiece 28 has an elongate shape in an overall direction substantially parallel to the longitudinal direction of the wiper blade 12. The endpiece 28 is extended at one of its longitudinal ends by a connecting part 30 for connecting to the rod of the driving arm 65.

FIG. 2 corresponds to a perspective depiction of a top view of a part of the connection device from FIG. 1, with a first adapter 26 and a second adapter 27 being combined. This first adapter 26 and this second adapter 27 are complementing adapters intended to be combined with the base adapter 25.

The first adapter 26 is a component of which a cross section is substantially U-shaped, comprising an upper wall 260 and also a first lateral wall 261 and a second lateral wall 262. These walls 260, 261 and 262 define an internal housing 263, this internal housing notably being able to receive a connector 24, not shown, or another adapter. The upper wall 260 extends mainly in a transverse-longitudinal plane, whereas the lateral walls 261 and 262 extend in parallel and distinct longitudinal-vertical planes. The lateral walls 261 and 262 are thus mutually parallel and perpendicular to the upper wall 260.

Furthermore, the first adapter 26 is substantially symmetrical about a plane of symmetry extending in longitudinal and vertical directions and situated equidistantly from the first lateral wall 261 and from the second lateral wall 262.

The upper wall 260 does not extend over the entire length of the lateral walls 261 and 262; in other words, the upper wall 260 does not extend from one longitudinal end to the other longitudinal end of the first adapter 26. Specifically, this first adapter 26 has clearances on the upper wall 260 in the vicinity of each longitudinal end of the first adapter 26. When viewed from above, the first adapter 26 is therefore H-shaped.

The lateral walls 261 and 262 have internal faces 264 which are the faces that face towards the internal housing 263. These internal faces 264, which are therefore opposite one another, bear stops 265 which project from the internal faces 264 and extend into the internal housing 263. These stops 265 are holding means which notably contribute to holding the first adapter 26 in place when it is assembled with another adapter, thus securing the assembly of several components.

According to the embodiment shown in FIG. 2, the upper wall 260 has two cavities 266 that are square in shape, positioned in the vicinity of the lateral walls 261 and 262. These cavities 266 are recesses in the upper wall 260, which extend from an upper face thereof towards the internal housing 263. The cavities 266 have end walls 267, extending in a direction of elongation of the connection device 1 corresponding to the longitudinal direction. These end walls 267 have markings 268, in this instance letters O. These markings 268 can be read irrespective of the longitudinal orientation of the first adapter 26. These markings 268 are intended to associate, for example visually, the first adapter 26 with a particular type of driving arm, when they are combined with a reference 258 borne by the base adapter 25. Such a combination will be described more specifically later on.

Each of the lateral walls 261 and 262 has a clearance 269 which extends from a free edge of this lateral wall towards the upper wall of the first adapter 26. The clearance 269 in the lateral wall 261 is symmetrical with respect to the clearance 269 in the lateral wall 262, about the plane of symmetry. These clearances 269, which take the shape of an arc of a circle, are able to receive a shaft of a driving arm.

The second adapter 27 is also a component of which a cross section is substantially U-shaped. The second adapter 27 has an upper wall 270 and also a first lateral wall 271 and a second lateral wall 272. The upper wall 270 extends mainly in a transverse-longitudinal plane, whereas the lateral walls 271 and 272 extend mainly in parallel and distinct longitudinal-vertical planes. The lateral walls 271 and 272 are thus mutually parallel and perpendicular to the upper wall 270. These walls 270, 271 and 272 define an internal housing 273, this internal housing notably being able to receive another adapter, in the present case the first adapter 26 described hereinabove. The upper wall 270 has a cutout 600 at its centre, so that this upper wall 270 constitutes merely a frame. At this central cutout 600 in the upper wall 270, the internal housing 273 communicates with the environment external to the adapter concerned. The upper wall 270 furthermore has a curved tab 276, which extends from one of the longitudinal ends of the second adapter 27 and away therefrom. This curved tab 276 contributes to the assembling of the second adapter 27 with other components, and notably with other adapters.

The lateral walls 271 and 272 have internal faces 274 which are the faces that face towards the internal housing 273. These internal faces 274, which are therefore opposite one another, bear stops 275 which project from the internal faces 274 and extend into the internal housing 273. These stops 275 notably allow the second adapter 27 to be secured to another adapter, preventing the translational movement of this second adapter 27 in a vertical direction.

Each of the lateral walls 271 and 272 has a clearance 279 which extends from the lower end of the second adapter 27 towards the upper end thereof. The clearance 279 in the lateral wall 271 is symmetrical with respect to the clearance 279 in the lateral wall 272, about the plane of symmetry. These clearances 279, which take the shape of an arc of a circle, are able to receive a shaft 573 of a driving arm, for example a third type of driving arm 57, such a shaft 573 being shown in FIG. 7.

One of the lateral walls 271 or 272 bears at least one protrusion 277, for example square in shape, which projects from this lateral wall 271 or 272, in the plane of the upper wall of the second adapter. This protrusion 277 consists of a continuation of material towards the other lateral wall 271 or 272, or in other words towards the lateral wall 271 or 272 from which it does not project. The protrusion 277 therefore causes the second adapter 27 to be asymmetric about a plane extending in longitudinal and vertical directions and situated equidistantly from the first lateral wall 271 and from the second lateral wall 272.

The protrusion 277 has a marking 278, shown here by a letter P, intended to associate, for example visually, the second adapter 27 with a type of driving arm when this marking is combined with the reference 258 borne by the base adapter 25. Such a combination of the marking 278 and the reference 258 will be described more specifically later on.

When the first adapter 26 and the second adapter 27 are combined within the connection device 1, the first adapter 26 comes housed in the internal housing 273 of the second adapter 27. The lateral walls 261 and 262 of the first adapter 26 thus face towards the lateral walls 271 and 272 of the second adapter 27. The upper wall 260 of the first adapter 26 comes housed in the central cutout 600 formed in the upper wall 270 of the second adapter 27, so that the upper wall 260 is covered by the upper wall 270 only in the region of one of the two cavities 266.

The protrusion 277 specifically comes housed in one of the cavities 266, such that at least one of the markings 268 of the first adapter 26 is covered by the marking 278 borne by the protrusion 277 of the second adapter 27. The marking 278 of the second adapter 27 is thus superposed on at least one of the markings 268 of the first adapter 26, as is shown in the figure in broken lines at the protrusion 277.

The first adapter 26 and/or the second adapter 27 may be combined with a base adapter 25, a first embodiment of which is shown in FIG. 3.

The base adapter 25 extends mainly in the longitudinal direction. This base adapter 25 has a body 254 which comprises a first lateral wall 251 and a second lateral wall 252, these walls being substantially mutually parallel and distant from one another. These walls 251, 252 are connected to one another by an upper wall 250 substantially perpendicular to them. The walls 250, 251, 252 of this base adapter 25 have a shape that is elongate in the longitudinal direction, and between them they define an internal housing 253 intended to accommodate the connector 24.

At one of its longitudinal ends, the body 254 of the base adapter 25 is connected to a head 255, the vertical and transverse dimensions of which are greater than those of the body 254 of the base adapter 25. It will thus be appreciated that the head 255 extends beyond a longitudinal and transverse plane in which the upper wall 250 extends, and beyond a longitudinal and vertical plane in which the lateral walls 251 and 252 extend. The head 255 notably acts as a locking member. This is because, when the wiper blade 12 is assembled on the driving arm 65 via the connection device 1 as illustrated in FIG. 1, this head 255 forms a stop for the endpiece 28, thus preventing the translational movement of the latter beyond the body 254 of the base adapter 25. The head 255 furthermore has, on one of its internal faces, not visible in FIG. 3, a curved internal portion able to receive the curved tab 276 of the second adapter 27, thus forming another retaining means.

At another of its longitudinal ends, the upper wall 250 of the base adapter 25 narrows to a point 257 which overhangs beyond the body 255. This point 257 bears a reference 258, shown here by the letter X, which is intended to associate the base adapter 25 with a first type of driving arm, not illustrated.

At this other longitudinal end, the body 254 of the base adapter 25, and more particularly the lateral walls 251, 252, are each continued in the form of an elastically deformable leg 256. These legs 256 can thus be brought closer together by elastic deformation. The legs 256 are substantially symmetrical about a plane of symmetry extending in longitudinal and vertical directions and situated equidistantly from the first lateral wall 251 and from the second lateral wall 252. Each leg 256 furthermore has a locking portion 426 shaped to collaborate with notches in the endpiece 28 in order to lock the assembly of the base adapter 25 therewith, thus constituting another locking means suited to the type of driving arm specific to the base adapter 25.

The upper wall 250 is pierced with three openings, having a first opening 259, a second opening 359 and a third opening 459 which are aligned in the longitudinal direction and provide access to the internal housing 253. The first opening 259 allows engagement of a tab with which the endpiece 28 of the driving arm 5 is equipped. The third opening 459, which is in the vicinity of the legs 256, is partially occupied by a tongue 458. This tongue 458 extends mainly in the longitudinal direction and has a fixed end 457 some distance from the legs 256, which is connected to the lateral wall 251 and to the lateral wall 252 by a bridge of material, and a free end 456 able to move in the vicinity of the legs 256. The tongue 458 is elastically deformable, and its free end 456 bears a push-button 455. When at rest, which is to say when not under stress, the tongue 458 is positioned such that the push-button 455 is located above the plane in which the upper wall 250 extends. When the base adapter 25 is being mounted in the endpiece 28, the push-button 455 engages by elastic clip-fastening in a corresponding opening in the endpiece 28 in order to lock the base adapter 25 with respect to this endpiece.

The lateral walls 251 and 252 are moreover respectively equipped with a through-orifice 451 and 452 which open onto the internal housing 253. The orifice 451 is substantially circular and the orifice 452 is substantially parallel-epipedal, and together they define an axis Y of pivoting of the base adapter 25 relative to the connector 24, this not being depicted in this figure, and, by extension, of the wiper blade 12 connected to the base adapter 25 relative to the driving arm connected to the connector 24. The orifice 451 has a ring 453 which projects on the lateral wall 251, extending from this lateral wall 251 towards the internal housing 253. The ring 453 contributes to the assembling of the base adapter 25 with the connector 24 by this ring 453 being elastically clip-fastened to complementing means of said connector 24. The orifices 451 and 452 and the ring 453 associated with the orifice 451 form a pivoting means for pivoting the base adapter 25 relative to the connector 24.

FIGS. 4 and 5 are perspective views of the connection device 1 from FIG. 1, this connection device 1 being detached from the wiper blade 12 in FIG. 4 but secured thereto in FIG. 5. This FIG. 5 therefore has a wiper blade 12 comprising a connection device 1 according to the invention.

According to the embodiment shown in these figures, the connection device 1 comprises notably the connector 24, the base adapter 25, the first adapter 26 and the second adapter 27, each of these adapters 25, 26 and 27 contributing to connecting the connector 24 to a particular type of driving arm 56, shown in FIG. 9. The connector 24 comprises a base 70, which extends mainly in the longitudinal direction. This connector 24 is secured to the wiper blade 12 via this base 70.

The base adapter 25 comprises at least one pivot member 50 mechanically connecting it to the connector 24 at its orifices 451 and 452. This pivot member 50 constitutes an articulation that allows the connector 24 to rotate with respect to the base adapter 25. Thus, when the connector 24 is secured to a wiper blade 12 as it is in FIG. 5, for example by crimping, this wiper blade 12 is able to pivot with respect to the base adapter 25 and to the driving arm to which this base adapter 25 is connected. As a result, the wiper blade 12 can, in its movements, perfectly follow the curved surface of the windscreen of the vehicle to which it is fitted.

According to the embodiment shown in these FIGS. 4 and 5, the base adapter 25, the first adapter 26 and the second adapter 27 are combined via the connection device 1.

According to the invention, a combination of the markings and the references of the adapters forms a code, for example a visual code, associated with particular types of driving arms. The markings, which were represented by letters in FIG. 4, are illustrated by numbers in FIG. 5. It will thus be appreciated that a combination of the reference 258 of the base adapter 25 and the marking 268 of the first adapter 26 forms a code associated with a particular type of driving arm, i.e. the second type of driving arm 65. A combination of the reference 258 of the base adapter 25 and the marking 278 of the second adapter 27 forms another code visually associated with another particular type of driving arm, i.e. the third type of driving arm 57. A combination of the reference 258 of the base adapter 25, the marking 268 of the first adapter 26 and the marking 278 of the second adapter 27 forms yet another code visually associated with yet another particular type of driving arm, i.e. the fourth type of driving arm 56, these particular types of driving arm 65, 57 and 56, respectively illustrated in FIGS. 8, 7 and 9, all being structurally different from one another and structurally different from the first type of driving arm with which only the base adapter 25 is associated. The association between each combination of references and markings and each particular type of corresponding driving arm will be described in more detail later on.

FIG. 6 shows an exploded view of various adapters that can contribute to the composition of the connection device 1. This exploded view is given by way of example and does not mean that all the adapters presented are compatible with one another, or that a combination of references and markings selected at random from among the references and markings of these various adapters will correspond to a particular type of driving arm.

According to one aspect of the invention, at least two of these various adapters fit one inside the other. Such interfitting is manifested in the fact that the adapters, first, second or base, which are substantially U-shaped components, can be nested one inside the other. One U-shaped adapter can thus cover another U-shaped adapter, which may itself cover yet another U-shaped adapter, and so on.

These various adapters are notably the base adapter 25, the first adapter 26 and the second adapter 27. The connection device 1 may also involve another complementing adapter, in this instance a third adapter 29. The connection device 1 may also involve a primary adapter 31, which is a base adapter according to an embodiment different from the embodiment described in relation to the base adapter 25 for the preceding figures. This primary adapter 31 therefore corresponds to an alternative to the base adapter 25.

The base adapter 25 and the primary adapter 31 are incompatible, what this means is that the connection device 1 may have either one, or the other, but not a combination of these two elements. Just like the base adapter 25, the primary adapter 31 is in direct contact with the connector 24 and comprises a means for rotating it relative thereto. Each of these two adapters 25 and 31 can therefore be combined with the connector 24, but they are not configured to be fitted one inside the other.

The primary adapter 31 extends mainly in the longitudinal direction. This primary adapter 31 has a body 314 which comprises a first lateral wall 311 and a second lateral wall 312, these walls being substantially mutually parallel and distant from one another. These walls 311, 312 are connected to one another by an upper wall 310 substantially perpendicular to them. The walls 310, 311, 312 have a shape that is elongate in the longitudinal direction, and between them they define an internal housing 313 intended to accommodate the connector 24, not shown.

At one of its longitudinal ends, the body 314 of the primary adapter 31 is connected to a head 315, the vertical and transverse dimensions of which are greater than those of the body 314 of the primary adapter 31. It will thus be appreciated that the head 315 extends beyond a longitudinal and transverse plane in which the upper wall 310 extends, and beyond a longitudinal and vertical plane in which the lateral walls 311 and 312 extend. The head 315 contributes to performing the role of immobilizing member. This is because, when the wiper blade 12 is assembled on a particular type of driving arm, associated with the primary adapter 31, via the connection device 1, this head 315 forms a stop for the endpiece 28, thus preventing the translational movement of the latter beyond the body 314 of the primary adapter 31. The head 315 furthermore has, on one of its internal faces, not visible in FIG. 6, a curved internal portion able to receive the curved tab 276 of the second adapter 27, thus forming another locking means.

The upper wall 310 of the primary adapter 31 has a cavity 316 and two parallel slots 317, the cavity and the slots being positioned substantially in the middle of the body 314 of the primary adapter 31 in a longitudinal direction. The cavity 316 has a substantially square shape, while the parallel slots 317 extend parallel to the lateral walls 311 and 312. The upper wall bears, between this cavity 316 for the one part and these parallel slots 317 for the other part, a reference 318 intended to visually associate this primary adapter 31 with a particular type of driving arm, not shown. It will be appreciated that this particular type of driving arm is structurally distinct from the particular types of driving arm with which are associated, in combination or separately, the base adapter 25 according to the first embodiment, the first adapter 26 and the second adapter 27.

The cavity 316 is, like the cavity 266 in the first adapter 26, able to house the protrusion 277 of the second adapter 27 when this second adapter 27 is combined with the primary adapter 31. It will therefore be appreciated that it is possible to combine the primary adapter 31 and the second adapter 27.

By contrast to the base adapter 25, the primary adapter 31 does not have any tabs. Thus, when the primary adapter 31 is included in a wiper system, it is possible to incorporate a spraying function, which is incompatible with the tabs 256 of the base adapter 25, in this wiper system. It will thus be appreciated that the configuration of the primary adapter 31, and notably the absence of tabs, makes it possible to incorporate this spraying function, whether the primary adapter 31 is used on its own or in combination with the second adapter 27.

The upper wall 310 is moreover pierced with a first opening 507 and a second opening 508 which are aligned in the longitudinal direction and provide access to the internal housing 313. The first opening 507 allows engagement of a tab with which the endpiece 28 of a driving arm associated with the primary adapter 31 is equipped. The second opening 508, which is in the vicinity of a longitudinal end of the primary adapter 31 opposite the head 315, is partially covered by a tongue 500. This tongue 500 has a fixed end 501 connected to the upper wall 310, and a movable free end 502, at a distance from the longitudinal end that bears the head 315 greater than the distance separating this head 315 from the fixed end 501. The tongue 500 is elastically deformable, and its free end 502 bears a push-button 503. When at rest, which is to say when not under stress, the tongue 500 is positioned such that the push-button 503 is located above the plane in which the upper wall 310 extends. When the primary adapter 31 is being mounted in the endpiece 28, the push-button 503 engages by elastic clip-fastening in a corresponding opening in the endpiece 28 in order to lock the primary adapter 31 with respect to this endpiece.

The lateral walls 311 and 312 of the primary adapter 31 are moreover respectively equipped with a through-orifice 504 and 505, the orifice 505 not being visible, which open onto the internal housing 313. The orifice 505 is substantially circular and the orifice 504 is substantially parallel-epipedal, and together they define an axis Y of pivoting of the primary adapter 31 relative to the connector 24, this not being depicted in this figure, and, by extension, of the wiper blade 12 connected to the primary adapter 31 relative to the driving arm connected to the connector 24. The orifice 505 has a ring which projects on the lateral wall 311, extending from this lateral wall 311 towards the internal housing 313. This ring contributes to the assembling of the primary adapter 31 with the connector 24 by this ring being elastically clip-fastened to complementing means of said connector 24. The orifices 504 and 505 and the ring associated with the orifice 505 form a pivoting means for pivoting the primary adapter 31 relative to the connector 24.

The third adapter 29 is a complementing adapter, within the meaning of the invention, which acts as a substitute for the first adapter 26, the second adapter 27, or the combination thereof. It is a component of which a cross section is substantially U-shaped. The third adapter 29 has an upper wall 290 and also a first lateral wall 291 and a second lateral wall 292. The upper wall 290 extends mainly in a transverse-longitudinal plane, whereas the lateral walls 291 and 292 extend mainly in parallel and distinct longitudinal-vertical planes. The lateral walls 291 and 292 are thus mutually parallel and perpendicular to the upper wall 290. These walls 290, 291 and 292 define an internal housing 293, this internal housing notably being able to receive a connector 24 or another adapter. The third adapter 29 has a shoulder 301, which has a curved tab 296 extending from one of the longitudinal ends of the third adapter 29 and away therefrom. This curved tab 296 contributes to the assembling of the third adapter 29 with other components and notably with other adapters, such as the base adapter 25, for example.

The shoulder 301 of the longitudinal end of the third adapter 29 which has the curved tab 296 is extended, away from this curved tab 296, by two lugs 302 which are pressed intimately against the lateral walls 291 and 292. These lugs 302 allow the third adapter 29 to be anchored to a driving arm, and in this respect constitute locking means.

Each of the lateral walls 291 and 292 has a clearance 299 which extends from the lower end of the third adapter 29 towards the upper end thereof. The clearance 299 in the lateral wall 291 is symmetrical with respect to the clearance 299 in the lateral wall 292, about the plane of symmetry. These clearances 299, which take the shape of an arc of a circle, are able to receive a shaft of a driving arm matched to the third adapter 29, such a shaft not being shown in this figure.

The upper wall 290 of the third adapter 29 is pierced with two parallel slots 294, positioned on the upper wall 290 in the vicinity of each of the lateral walls 291 and 292. These parallel slots 294 are aligned with one another in the transverse direction and open onto the internal housing 293. These parallel slots 294, at a longitudinal end of the third adapter 29 that does not bear the curved tab 296, open onto an opening 297 which is likewise pierced in the upper wall 290. This opening 297 is partially covered by a tongue 400. This tongue 400 has a fixed end 401 connected to the upper wall 290, and a movable free end 402, at a distance from the longitudinal end that bears the curved tab 296 greater than the distance separating this curved tab 296 from the fixed end 401. The tongue 400 is elastically deformable, and its free end 402 bears a push-button 403. When at rest, which is to say when not under stress, the tongue 400 is positioned such that the push-button 403 is located above the plane in which the upper wall 290 extends. When the third adapter 29 is being assembled with another adapter to form a connection device 1 according to the invention, for example with a base adapter 25, the tongue 400 of the third adapter 29 covers the tongue 458 of the base adapter 25.

The upper wall 290 of the third adapter 29 bears a marking 298, in this instance the letter S. When the third adapter 29 is combined with the first adapter 26 and/or the second adapter 27, the upper wall 290 at least partially covers the markings of these adapters 26 and 27, which are the markings 268 and 278, respectively. Conversely, when the third adapter 29 is combined with the base adapter 25, the reference 258 of this base adapter 25 is not covered by the upper wall 290 of the third adapter 29. It is thus possible for a user of the connection device 1 to combine the marking 298 of the third adapter 29 and the reference 258 of the base adapter 25 to form a code. This code is associated, for example visually, with the fifth particular type of driving arm 59, shown in FIG. 10, which is structurally distinct from the types of driving arm mentioned above.

FIGS. 7 to 10 show various embodiments of the connection device 1 in several possible adapter combinations, with the driving arms intended to be associated visually with different combinations of references and markings of these adapters. Such references and markings are preferably positioned on a part of the adapters that is visible to the user when they make use of the connection device 1. In these FIGS. 7 to 10, the connection devices 1 are illustrated in a top view, whereas the driving arms are shown in a perspective side view. In this instance, these driving arms are positioned at the side of the connection devices 1, but it will be appreciated that they are intended to be driven onto these connection devices 1 in order to form, with the wiper blade and the connector, a wiper system.

FIG. 7 illustrates a connection device 1 comprising the base adapter 25 and the second adapter 27. In this instance, this connection device 1 is associated with the third type of driving arm 57.

The second adapter 27 partially covers the base adapter 25 such that its lateral walls 271, 272 are positioned facing the lateral walls 251, 252 of the base adapter 25. The curved tab 276 of the second adapter 27 comes into contact with a curved internal portion which is able to receive it and is positioned on one of the internal faces of the head 315, this curved tab 276 and this internal face not being visible in this figure. The upper wall 270 of the second adapter 27 covers the upper wall 250 of the base adapter 25, the central cutout 600 in the second adapter 27 leaving the tongue 458 and the push-button 455 of the base adapter 25 accessible.

When these two adapters 25 and 27 are assembled, the user of the connection device 1 thus formed refers to the code constituted by the combination of the reference 258 of the base adapter 25 and the marking 278 of the second adapter 27, and they can therefore check that this combination correctly forms the code visually associated with the particular type of driving arm with which their vehicle is equipped, corresponding to the third type of driving arm 57.

This driving arm 57 comprises a yoke 570 formed in the end part 578 of the third type of driving arm 57. This yoke 570 is notably made up of a longitudinal wall 571 extending in the longitudinal direction of the driving arm 57, this longitudinal wall 571 being flanked by two lateral sidewalls 572 perpendicular to it. One of these two lateral sidewalls 572 bears a shaft 573 and a locking arm 574, which extend from this lateral sidewall 572 and perpendicularly thereto. When the connection device 1 comprising this base adapter 25 and this second adapter 27 is being combined with the third type of driving arm 57, the connection device 1 is pivoted by 45° such that the shaft 573 is inserted in the orifices 451 and 452 in the base adapter, and then it is aligned in the longitudinal direction. The locking arm 574 then grips the connection device 1, thus securing it to the wiper blade.

FIG. 8 shows a connection device 1 comprising the base adapter 25 and the first adapter 26, this connection device 1 being associated with the second type of driving arm 65 in this figure.

The first adapter 26 partially covers the base adapter 25 such that its lateral walls 261, 262 are positioned facing the lateral walls 251, 252 of the base adapter 25. The upper wall 260 of the first adapter 26 covers the upper wall 250 of the base adapter 25, this first adapter 26 resting on the body 254 of the base adapter 25. More specifically, this body 254 covers the second opening 359 pierced in the upper wall 250. Such an arrangement of the first adapter 26 leaves the tongue 458 and the push-button 455 of the base adapter 25 accessible.

When these two adapters 25 and 26 are assembled, the user of the connection device 1 thus formed refers to the code constituted by the combination of the reference 258 of the base adapter 25 and the marking 268 of the first adapter 26, and they can therefore check that this combination correctly forms the code associated with the particular type of driving arm with which their vehicle is equipped, corresponding to the second type of driving arm 65.

This driving arm 65 comprises a yoke 650 formed in the end part 658 of the second type of driving arm 65. This yoke 650 is notably made up of a longitudinal wall 651 extending in the longitudinal direction of the driving arm 65, this longitudinal wall 651 being flanked by two lateral sidewalls 652 perpendicular to it. The yoke 650 is provided with two bent-over edges formed at the free end of each of the lateral sidewalls 652. A first bent-over edge 653A is longer than a second bent-over edge 653B, the latter being positioned in the vicinity of an entrance that gives access to a receiving cavity 654.

When the connection device 1 comprising this base adapter 25 and this first adapter 26 is being combined with the second type of driving arm 65, the connection device 1 is inserted by sliding longitudinally into the receiving cavity 654 delimited in the yoke 650 by the longitudinal wall 651, the lateral sidewalls 652 and the bent-over edges 653A and 653B. For this purpose, the legs 256 of the base adapter 25 are elastically deformed to bring them closer together so that they can come housed in the receiving cavity 654. In the same way, the tongue 458 and the push-button 455 of the base adapter 25 retract and are thus pushed in towards the internal housing 253 of the base adapter 25. The longitudinal translational movement of the connection device 1 is prevented when the push-button 455 enters an orifice 655 pierced in the longitudinal wall 651 of the yoke 650, this orifice 655 being able to receive it.

FIG. 9 illustrates a connection device 1 according to the invention, this connection device 1 being notably composed of the base adapter 25, the first adapter 26 and the second adapter 27. In this instance, this connection device 1 is associated with the fourth type of driving arm 56.

These adapters 25, 26 and 27 are fitted one into another such that the second adapter 27 covers the first adapter 26, which itself covers the base adapter 25.

The protrusion 277 of the second adapter 27 comes housed in one of the cavities 266 of the first adapter 26, the marking 268 of the first adapter 26 being covered by the marking 278 borne by the protrusion 277 of the second adapter 27 as a result. The reference 258 of the base adapter 25 is not covered.

When these three adapters 25, 26 and 27 are fitted one into another, the user of the connection device 1 thus formed refers to the code constituted by the combination of the reference 258 of the base adapter 25, the marking 268 of the first adapter 26, and the marking 278 of the second adapter 27, and they can therefore check that this combination correctly forms the code associated with the particular type of driving arm with which their vehicle is equipped, corresponding to the fourth type of driving arm 56.

This driving arm 56 comprises a yoke 560 formed in the end part 568 of the fourth type of driving arm 56. This yoke 560 is notably made up of a longitudinal wall 561 extending in the longitudinal direction of the driving arm 56, this longitudinal wall 561 being flanked by two lateral sidewalls 562 perpendicular to it. Some distance from the longitudinal wall in a vertical direction, the yoke 560 is provided with a bent-over edge 563 formed at the free end of each of the lateral sidewalls 652.

When the connection device 1 comprising this base adapter 25, this first adapter 26 and this second adapter 27 is being combined with the fourth type of driving arm 56, the connection device 1 is inserted into a receiving cavity 564 delimited in the yoke 560 by the longitudinal wall 561, the lateral sidewalls 562 and the bent-over edge 563. For this purpose, the legs 256 of the base adapter 25 are elastically deformed to bring them closer together so that they can come housed in the receiving cavity 564. In the same way, the tongue 458 and the push-button 455 of the base adapter 25 are pushed in towards the internal housing 253 of the base adapter 25. The longitudinal translational movement of the connection device 1 is prevented when the push-button 455 opens into an orifice 565 pierced in the longitudinal wall 561, this orifice 565 being able to receive it.

FIG. 10 presents a connection device 1 according to the invention, this connection device 1 being notably composed of the base adapter 25 and the third adapter 29. In this instance, this connection device 1 is associated with a fifth type of driving arm 59.

When the base adapter 25 and the third adapter 29 are being assembled, this third adapter 29 partially covers the base adapter 25, nesting above the latter. It will thus be appreciated that the third adapter 29 covers the base adapter 25 such that its lateral walls 291, 292 are positioned facing the lateral walls 251, 252 of the base adapter 25. The upper wall 290 of the third adapter 29 partially covers the upper wall 250 of the base adapter 25, this third adapter 29 resting on the body 254 of the base adapter 25. In the same way, the tongue 400 of the third adapter 29 covers the tongue 458 of the base adapter 25.

When these two adapters 25 and 29 are assembled, the user of the connection device 1 thus formed refers to the code constituted by the combination of the reference 258 of the base adapter 25 and the marking 298 of the third adapter 29, and they can therefore check that this combination correctly forms the code associated with the particular type of driving arm with which their vehicle is equipped, corresponding to the fifth type of driving arm 59.

This driving arm 59 comprises a yoke 590 formed in the end part 598 of the fifth type of driving arm 59. This yoke 590 is notably made up of a longitudinal wall 591 extending in the longitudinal direction of the driving arm 59, this longitudinal wall 591 being flanked by two lateral sidewalls 592 perpendicular to it. Each lateral sidewall 592 has an aperture 593 which extends from a first longitudinal end of the yoke 590 in a longitudinal direction.

When the connection device 1 comprising this base adapter 25 and this third adapter 29 is being combined with the fifth type of driving arm 59, the connection device 1 is inserted longitudinally into a receiving cavity 594 delimited in the yoke 590 notably by the longitudinal wall 591 and the lateral sidewalls 592. For this purpose, the legs 256 of the base adapter 25 are elastically deformed to bring them closer together so that they can come housed in the receiving cavity 594. In the same way, the tongue 400 and the push-button 403 of the third adapter 29 are pushed in towards the internal housing 293 of the base adapter 25. The longitudinal translational movement of this connection device 1 is prevented when the push-button 403 reaches an orifice 595 pierced in the longitudinal wall 591, this orifice 595 being able to receive it. The interaction of the lugs 302 of the third adapter 29 with the apertures 593 contributes to preventing any vertical movement between the third adapter 29 and the yoke 590.

The present invention thus proposes a device for connecting a wiper blade to a driving arm, having a base adapter and at least one complementing adapter. The base adapter has a reference and the complementing adapter has a marking, for example visual ones, which, when combined, form a code, a user reading this code then being able to combine it with a corresponding driving arm. Such a connection device makes it possible for the user to check that the assembly of the wiper blade and the driving arm is compatible. This check is made more reliable since an unused reference or marking is hidden by a part of the adapter that covers it, thus reducing the risk of error.

However, the present invention is not limited to the means and configurations described and illustrated herein and it also extends to all equivalent means and configurations and to any technically functional combination of such means.

The invention claimed is:

1. A connection device for connecting a wiper blade to a driving arm for a vehicle, comprising:
   at least one connector configured to be secured to the wiper blade;
   a base adapter configured to connect the connector to a first type of driving arm, the base adapter comprising:
      at least one pivot member connecting the base adapter to the connector; and
      at least one reference configured to associate the base adapter with the first type of driving arm; and
   at least one complementing adapter comprising a first adapter having at least one cavity, the cavity comprising a bottom wall, at least one marking of the first adapter being positioned on the bottom wall, a combination of the at least one marking of the first adapter with the at least one reference of the base adapter forming a code visually associated with a second type of driving arm;
   wherein the at least one marking of the first adapter and the at least one reference of the base adapter are disposed such that they are visible to a user of the connection device while the complementing adapter is connected to the base adapter; and
   wherein the at least one marking of the first adapter and the at least one reference of the base adapter are at least one of letters and numbers.

2. The connection device according to claim 1, further comprising at least one stop and one locking member that are configured to secure at least one of the adapters relative to the type of driving arm with which it is intended to be associated.

3. The connection device according to claim 2, wherein the locking member is positioned on an upper wall of the base adapter or an upper wall of the complementing adapter.

4. The connection device according to claim 1, wherein the at least one complementing adapter comprises a second adapter which has at least one protrusion, a marking of the second adapter being positioned on this protrusion, the combination of the marking of the second adapter with the reference of the base adapter forming a code visually associated with a third type of driving arm.

5. The connection device according to claim 4, wherein the protrusion of the second adapter comes housed in the cavity in the first adapter, the marking of the second adapter being at least partially superposed on the marking of the first adapter, the combination of the marking of the first adapter, the marking of the second adapter and the reference of the base adapter forming a code visually associated with a fourth type of driving arm.

6. The connection device according to claim 1, wherein the at least one complementing adapter comprises a third adapter, this third adapter having at least one marking, the combination of the marking of the third adapter with the reference of the base adapter forming a code being configured to visually associate this third adapter with a fifth type of driving arm.

7. The connection device according to claim 1, wherein at least one of the adapters fits inside the base adapter or at least one complementing adapter.

8. A wiper blade comprising a connection device according to claim 1.

9. A wiper system comprising: a driving arm bearing a wiper blade according to claim 8, the wiper blade being connected to the driving arm by the connection device.

* * * * *